US010298349B2

(12) United States Patent
Gao et al.

(10) Patent No.: US 10,298,349 B2
(45) Date of Patent: May 21, 2019

(54) RECEIVE SUPERVISION METHOD AND RADIO UNIT

(71) Applicant: Telefonaktiebolaget LM Ericsson (publ), Stockholm (SE)

(72) Inventors: Xiang Gao, Beijing (CN); Ming Li, Beijing (CN); Wenbin Yin, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1 day.

(21) Appl. No.: 15/532,352

(22) PCT Filed: Dec. 22, 2014

(86) PCT No.: PCT/CN2014/094502
§ 371 (c)(1),
(2) Date: Jun. 1, 2017

(87) PCT Pub. No.: WO2016/101096
PCT Pub. Date: Jun. 30, 2016

(65) Prior Publication Data
US 2018/0270006 A1 Sep. 20, 2018

(51) Int. Cl.
| H04J 3/14 | (2006.01) |
| H04B 1/48 | (2006.01) |
| H04L 5/14 | (2006.01) |
| H04W 52/02 | (2009.01) |
| H04W 72/04 | (2009.01) |
| H04B 1/525 | (2015.01) |

(52) U.S. Cl.
CPC ............ *H04J 3/14* (2013.01); *H04B 1/48* (2013.01); *H04B 1/525* (2013.01); *H04L 5/1423* (2013.01);
(Continued)

(58) Field of Classification Search
CPC ........ H04J 3/14; H04L 5/1423; H04L 5/1461; H04W 52/0216; H04W 72/0446
See application file for complete search history.

(56) References Cited

U.S. PATENT DOCUMENTS

| 5,649,008 A * | 7/1997 | Bader ................ H04M 1/585 379/390.01 |
| 2002/0119797 A1 * | 8/2002 | Woodhead ............ H04W 52/24 455/522 |

(Continued)

FOREIGN PATENT DOCUMENTS

| CN | 101282127 A | 10/2008 |
| CN | 102104366 A | 6/2011 |

(Continued)

OTHER PUBLICATIONS

PCT Notification of Transmittal of the International Search Report and the Written Opinion of the International Searching Authority, or the Declaration for International application No. PCT/CN2014/094502—dated Sep. 11, 2015.

(Continued)

*Primary Examiner* — Benjamin H Elliott, IV
(74) *Attorney, Agent, or Firm* — Baker Botts L.L.P.

(57) ABSTRACT

A TDD radio unit and a real-time RX supervision method used therein are provided. The method comprises steps of: setting the radio unit into an RX supervision status in a TX timeslot, wherein the setting comprises: connecting a TX observation module in the radio unit to a termination port of a Transmit/Receive (TR) switch in the radio unit; and setting all components in the RX path in a power-on status; detecting a gain of the TX observation module by means of a signal from the TR switch passing through the TX observation module and a gain of the RX path by means of a TX leakage signal passing through the RX path; calculating a gain difference between the TX observation module and the RX path; and comparing the calculated gain difference with a preset gain difference to determine a state of the RX path. With the TDD radio unit and RX supervision method, the TX leakage signal is used, and thus no extra simulation source is need. Furthermore, a real time supervision is performed.

19 Claims, 10 Drawing Sheets

(52) U.S. Cl.
CPC ....... *H04L 5/1461* (2013.01); *H04W 52/0216* (2013.01); *H04W 72/0446* (2013.01); *Y02D 70/00* (2018.01); *Y02D 70/1262* (2018.01); *Y02D 70/146* (2018.01); *Y02D 70/40* (2018.01)

(56) References Cited

U.S. PATENT DOCUMENTS

| | | | | |
|---|---|---|---|---|
| 2004/0247042 | A1* | 12/2004 | Sahlman | H03F 1/3247 375/297 |
| 2006/0194546 | A1* | 8/2006 | Gunnarsson | H04W 28/18 455/69 |
| 2017/0149457 | A1* | 5/2017 | Mayer | H04B 17/13 |
| 2018/0270006 | A1* | 9/2018 | Gao | H04B 1/48 |

FOREIGN PATENT DOCUMENTS

| | | |
|---|---|---|
| CN | 103918187 A | 7/2014 |
| WO | 2012 145866 A1 | 11/2012 |
| WO | WO 2013044481 A1 | 4/2013 |
| WO | WO 2014016704 A2 | 1/2014 |

OTHER PUBLICATIONS

Extended European Search Report for Application No. / Patent No. 14908667.0-1874 / 3238347 PCT/CN2014094502—dated Dec. 7, 2017.

\* cited by examiner

RECEIVE SUPERVISION METHOD AND RADIO UNIT

PRIORITY

This nonprovisional application is a U.S. National Stage Filing under 35 U.S.C. § 371 of International Patent Application Serial No. PCT/CN2014/094502 filed Dec. 22, 2014, and entitled "Receive Supervision Method And Radio Unit."

TECHNICAL FIELD

The disclosure relates to a Time Division Duplex (TDD) circuit, and in particular, to a TDD radio unit and a real-time Receive (RX) supervision method used in the radio TDD unit.

BACKGROUND

Unless otherwise indicated herein, the approaches described in this section are not prior art to the claims in this disclosure and are not admitted to be prior art by inclusion in this section.

RX supervision in a radio unit (including base station, user equipment and so on) is an important feature to supervise the sanity of the RX chain for radio characteristic and robustness, and to report an abnormal situation. A normal RX operation may be impacted by components quality, aging or broken by internal or external high power level interferes by wrong operation which could exceed prediction level in practical applications.

Cellular technologies specified by the 3rd Generation Partnership Program (3GPP) are the most widely deployed in the world. A new step being studied and developed in 3GPP is an evolution of 3G into an evolved radio access technology referred to as Long-Term Evolution(LTE). In LTE, different modes of communications can be used for radio nodes in a cellular network, such as Frequency Division Duplex (FDD), Time Division Duplex (TDD) and half duplex. In TDD radio, the uplink and downlink communication between a base station and a mobile phone uses the same frequency band (i.e., carrier) but different timeslots to separate the receive (RX) operation and transmit (TX) operation, i.e., the RX operation and TX operation take place in different, non-overlapping timeslots.

FIG. 1 shows a typical TDD radio unit. As shown, a typical TDD radio unit comprises a baseband processing circuit, a TX path, a Transmitter Observation Receiver (TOR) module, a circulator, a filter unit (FU), an antenna, a Transmit/Receive (TR) swich and an RX path. The baseband processing circuit processes a baseband signal and transmits it to the TX path for transmission over the antenna, and processes a baseband signal received from the RX path. The TX path converts the baseband signal to an RF signal so as to transmit it over the antenna. The RX path converts an RF signal received from the antenna to a baseband signal that will be processed by the baseband processing circuit. The TOR module is coupled to receive an output of the TX path and provide feedback signals to the baseband processing circuit so as to perform calibration and pre-distortion measurements on the TX path. The circulator plays the role to separate the TX path and the RX path signal. Since the RX operation and the TX operation of the TDD radio unit use the same frequency band in a TDD system, a single two-port cavity filter unit may be shared for both the RX path and TX path of the radio unit. During the TX operation of the radio unit, the TR switch is switched to its termination, as shown in FIG. 1. A reflected TX signal from the antenna or the filter unit will go through the TR switch and absorbed by the termination of the TR switch. Generally, the terminaltion is a 50 ohm high power termination. During the RX operation of the radio unit, the TR switch is connected to the RX path. The normal RX operation may be impacted by components quality, aging and other factors. For illustration, the TX path comprises a TX low level block, a power amplifier (PA), and a TOR Local Oscillator (LO). The RX path comprises an RF Low Noise Amplifier (LNA) block, an RX Local Oscillator (LO), and an RX block. The components of the TX path are set in a power-on state for a TX operation, while the components of the RX path are set in a power-on state for an RX operation.

The RX path of a TDD radio unit is generally designed under certain input power level limitation and could be broken if an input signal exceeds a prediction level. In a TDD system there are potential risks for the RX path, which are listed below. FIG. 2 shows the potential risks.

1. The RX front-end (i.e., the LNA block) could be possibly broken by a high power level due to misaligned TDD switching from its self TX operation by a wrong operation when there is no hardware fault prevention of TDD control. It is shown by a dashed line in FIG. 2, and may be classified as an internal interference.
2. RX/TX un-alignment due to a timing error or no co-operation among operators may cause a TX signal of a TDD radio unit to damage the RX front-end of other radio units in the same sector, which may cause a risk to damage the RX path of the other radio units. This scenario may also happen for example when co-sitting between a TDD system and a WiMax system. It is shown by a dotted line in FIG. 2, and may be classified as an external interference.

FIG. 3 shows a typical RX protection method used in a TDD radio unit, where an RF limiter is placed in front of the LNA block of the RX path. When a high level interfering signal enters the RX path, the RF limiter limits the power of the input signal to a certain safe zone for the subsequent LNA block.

However, this solution is only targeting to radio hardware protection against interference from outside. It will not guarantee an even higher input power level. The leakage power after the RF limiter will possibly saturate every component after the LNA block if the RX path is still working.

Above all, in TDD radio unit, the RX path is more fragile. So, there is a need to have an RX supervision function, reporting a status concerning the sanity of the gain of the RX path.

There have been proposed some RX supervision technologies. Some of the RX supervision technologies that are used in product comprise the following:

1. LNA current monitoring. This solution will monitor the current variation and report an error or warning by a multi-channel ADC when the supervised current variation value is out of limit.
2. Test tone injection. This solution will inject a test tone generated by a synthesizer whose frequency is located in the middle of the guard band of the radio unit normally. Together with the LNA current monitoring, the entire RX path will be supervised.

Still there are some RX supervision technologies which, among other, comprise the following:

3. Usage of an in-band noise floor measurement in RX digital part to test the sanity of the RX path from the LNA block to the end of the RX path via an in-band power detector interface.

The above existing technologies of RX supervision have respective problems.

1. For LNA current monitoring, the drawbacks are:
   LNA current supervision cannot supervise the entire RX path.
   Current cannot directly reflect the radio performance.
2. For test tone injection, the drawbacks are:
   Test LO leakage could aggravate the clock leakage on board.
   LO injection must be behind of the LNA block to avoid introducing extra RX noise figure, which means that LO injection can't provide an entire RX supervision.
   Test tone injection needs an extra hardware of the synthesizer, and thus increases the PCB size.
3. For in-band noise floor measurement, the drawbacks are:
   The noise floor estimation relies on an assumption that during sufficiently long observation time (hours) and regardless of a particular air interface, a measured carrier power will be at the noise floor level, i.e., no UE signal and/or interference will be present for a certain long time.
   The assumption causes the method to be almost impractical.

Therefore, there is a need for an improved RX supervision method.

SUMMARY

An object of the disclosure is to provide an RX supervision method and a TDD radio unit which can overcome at least one of the above mentioned technical problems.

According to a first aspect, there is provided an RX supervision method for use in a Time Division Duplex (TDD) radio unit. In a Transmit (TX) timeslot, the radio unit is set into an RX supervision status. The setting comprises: connecting a TX observation module in the radio unit to a termination port of a Transmit/Receive (TR) switch in the radio unit; and setting all components in the RX path in a power-on status. Then a gain of the TX observation module by means of a signal from the TR switch passing through the TX observation module and a gain of the RX path by means of a TX leakage signal passing through the RX path are detected. A gain difference between the TX observation module and the RX path is calculated, and compared with a preset gain difference to determine a state of the RX path. With the method, a real-time RX supervision can be performed.

Furthermore, the TX leakage signal is used, and thus no extra simulation source is needed.

In one embodiment, the RX supervision status is triggered in a Digital Pre-Distortion (DPD) idle period.

In one embodiment, the method further comprises a step of exiting the RX supervision status and entering a normal DPD period.

In one embodiment, the method further comprises a step of detecting a state of the TX observation module.

In one embodiment, the method further comprises a step of determining that the RX path is abnormal if the TX observation module is normal while the calculated gain difference deviates from the preset gain difference by a value larger than a threshold.

In one embodiment, a temperature drift of the TR switch is taken into account when calculating the gain difference.

In one embodiment, the calculated gain difference is an average of gain differences of the TX leakage signal over the bandwidth of the radio unit, and an average of pre-set gain differences of difference freqiencies over the bandwidth is used as the pre-set gain difference.

In one embodiment, the bandwidth of the radio unit is a bandwidth of an active mode of the radio unit if the radio unit is capable of operating in more than one mode.

In one embodiment, the TX observation module comprises a Transmitter Observation Receiver (TOR).

According to a second aspect, there is provided a TDD radio unit comprising a Transmit (TX) path for transmission and a Receive (RX) path for reception, and a Transmit/Receive (TR) switch. The radio unit further comprises a TX observation module connecting to the TX path and used for monitoring the TX path; a controller configured to set the radio unit into an RX supervision status in a TX timeslot, by: connecting the TX observation module in the radio unit to a termination port of the TR switch, and setting all components in the RX path in a power-on status; a detector configured to detect a gain of the TX observation module by means of a signal from the TR switch passing through the TX observation module and a gain of the RX path by means of a TX leakage signal passing through the RX path, and a processor configured to calculate a gain difference between the TX observation module and the RX path, and compare the calculated gain difference with a preset gain difference to determine a state of the RX path. Only a connection from the TX observation module to the TR switch is additionally needed in the TDD radio unit according to the disclosure to perform the RX supervision. Compared with other RX supervision technologies, the hardware cost is minimized.

According to a third aspect, there is provided a computer readable storage medium stored thereon computer instructions, which when executed on at least one processor, cause the at least one processor to execute the method according to the disclosure.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

The TX leakage signal in a TDD radio unit is weak, but it is still relatively strong enough for the RX path to detect, because an RX path normally can detect a signal lower than −100 dBm in-band power.

Figure 1:
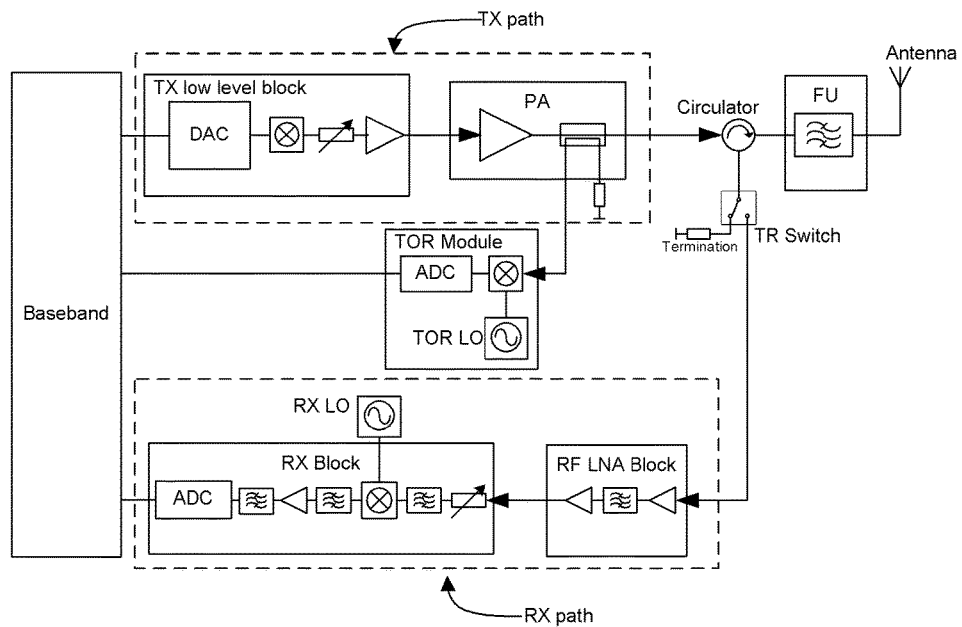
FIG. 1 shows a typical TDD radio unit.
Figure 2:
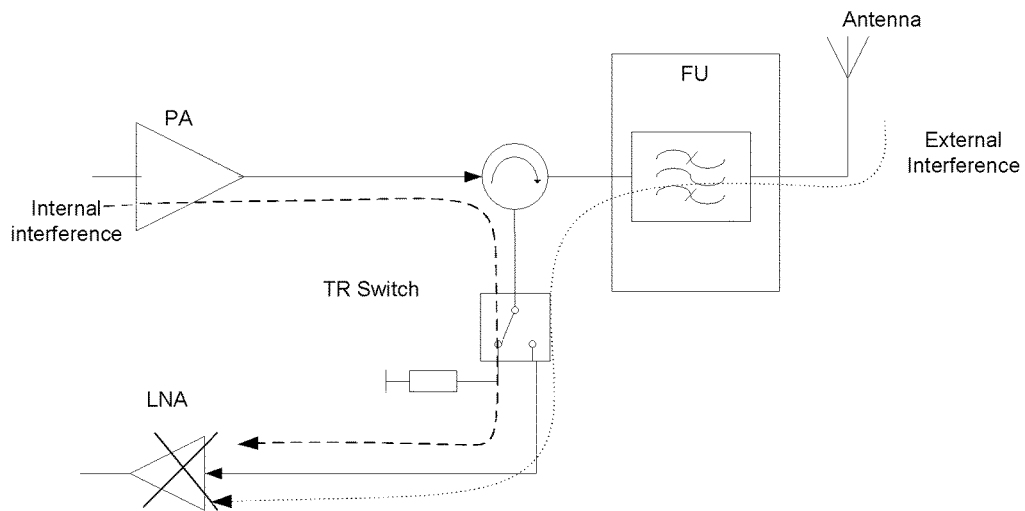
FIG. 2 illustrates the possible risk of an RX path.
Figure 3:
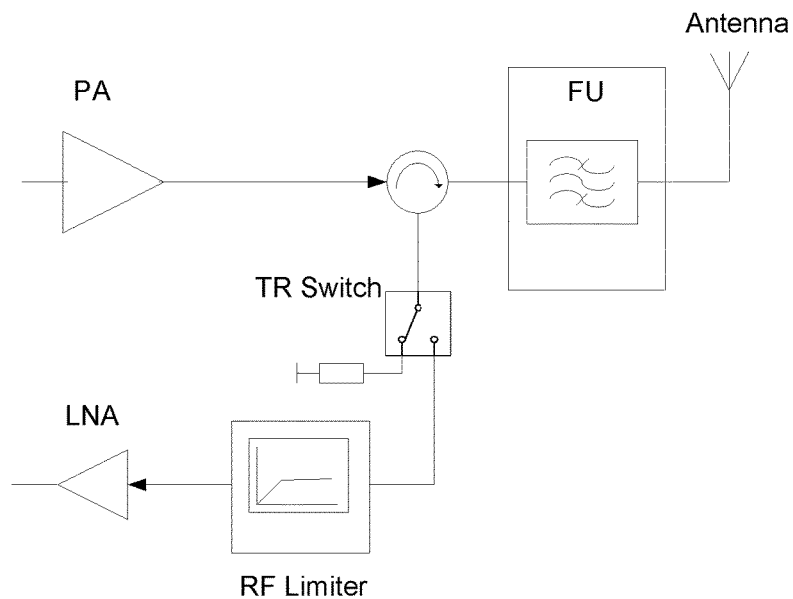
FIG. 3 a typical RX protection method used in a TDD radio unit.
Figure 4:
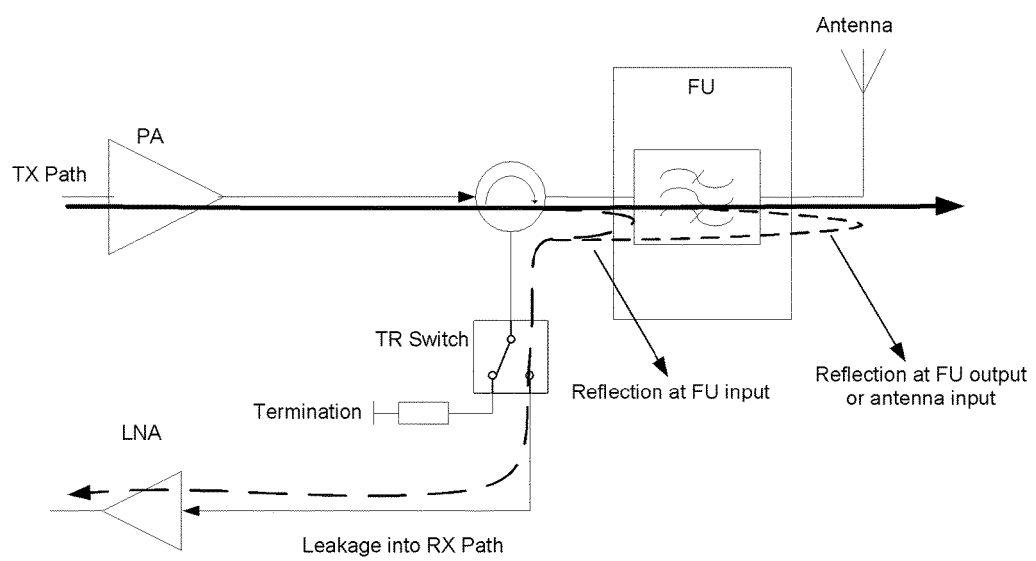
FIG. 4 illustrates a TX leakage signal flow in a TDD radio unit.

FIG. 4 illustrates a TX leakage signal flow in a TDD radio unit. The rough solid line shows the TX signal flow, while the dashed line shows the TX leakage signal flow. When the TDD radio unit is operating in a TX timeslot, the TX signal may be reflected before the filter unit or/and between the filter unit and the antenna due to not perfect impedance matching. The TX leakage signal from the above reflection situations may be received by the RX path within a normal dynamic range.

The TX leakage signal is used in the disclosure to supervise the gain of the RX path.

Figure 5:
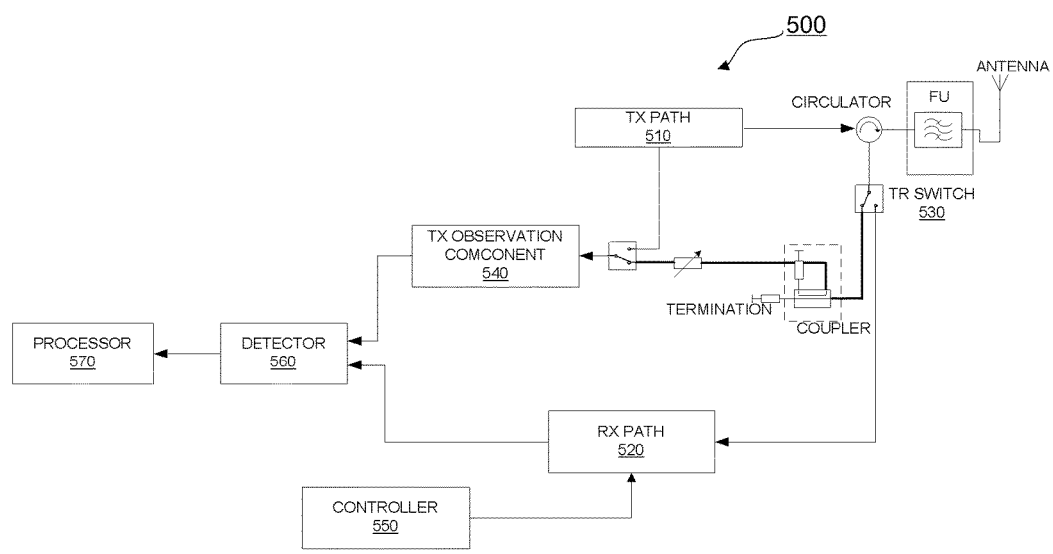
FIG. 5 illustrates a block diagram of a TDD radio unit according to an embodiment of the disclosure.

FIG. 5 illustrates a block diagram of a TDD radio unit 500 according to an embodiment of the disclosure. The TDD radio unit may be a network node or a terminal device. As shown, the TDD radio unit 500 comprises a TX path 510 for transmission, an RX path 520 for reception, a TR switch 530, a TX observation module 540, a controller 550, a detector 560 and a processor 570. The TX path 510 may be structured as needed for transmitting an RF signal from the radio unit to outside. The RX path 520 may be constructed as needed for receiving an RF signal from outside. Both the exact structures of the TX path 510 and the RX path 520 are familiar to one skilled in the art. The TR switch 530 is used to switch between the TX path and the RX path together with a circulator. When the radio unit is operating in its TX timeslot, the TX path is in a power-on state and the TR switch connects to its termination. When the radio unit is operating in its RX timeslot, the RX path is in a power-on state and the TR switch connects to the RX path. The TX observation module 540 couples to an output of the TX path 510 to monitor the TX path, so as to perform calibration and pre-distortion measurements on the TX path 510. In an enbodiment, the TX observation module 540 is a TOR component in the radio unit. The controller 550 is configured to set the radio unit into an RX supervision status in a TX timeslot. More particularly, the controller 550 controls the radio unit to connect the TX observation module in the radio unit to a termination port of the TR switch, and set all components in the RX path in a power-on status. The detector 560 is configured to detect a gain of the TX observation module 540 by means of a signal from the TR switch 530 passing through the TX observation module 540 and a gain of the RX path 520 by means of a TX leakage signal passing through the RX path 520. The processor 570 is configured to calculate a gain difference between the TX observation module 540 and the RX path 510, and compare the calculated gain difference with a preset gain difference to determine a state of the RX path. It should be understood by one skilled in the art that the radio unit may comprise other components necessary for its normal operations, such as the circulator shown in the figure and other elements (for example, the baseband processing circuit) that haven't been shown in the figure. These components are not described in detail for simplification and not to obscure the concept of the disclosure.

A connection from the TR switch 530 to the TX observation module 540 is provided in the radio unit. The purpose for the connection is to make the TX observation module 540 and the RX path 520 have the same TX leakage injection point during the RX supervision. In an embodiment, the connection from the TR switch 530 to the TX observation module 540 may be implemented by coupling power from the TX leakage signal with a coupler implemented between an input termination of the TX observation module 540 and the termination port of the TR switch. A switcher is provided between the input termination of the TX observation module 540 and an output of the coupler, for switching the TX observation module between the TX path and the coupler. During the normal TX operation of the radio unit, the switcher connects the TX observation module 540 to the TX path. During the RX supervision period, the switcher connects the TX observation module to the TR switch 530. In an embodiment, an adjustable attenuator is provided to adjust the gain of the TX leakage signal over the TX observation module. The adjustable attenuator may be provided between the switcher and the coupler as shown, or any other place before the input of the TX observation module. It should be understood by one skilled in the art that the connection is not limited to the one shown in FIG. 5, and any other appropriate connection is appliable. Compared with the other RX supervision technologies, the RX supervision according to the disclosure only needs an dditional connection provided from the TR switch to the TX observation module, and thus minimizes the additional hardware cost for the RX supervision.

Figure 6:
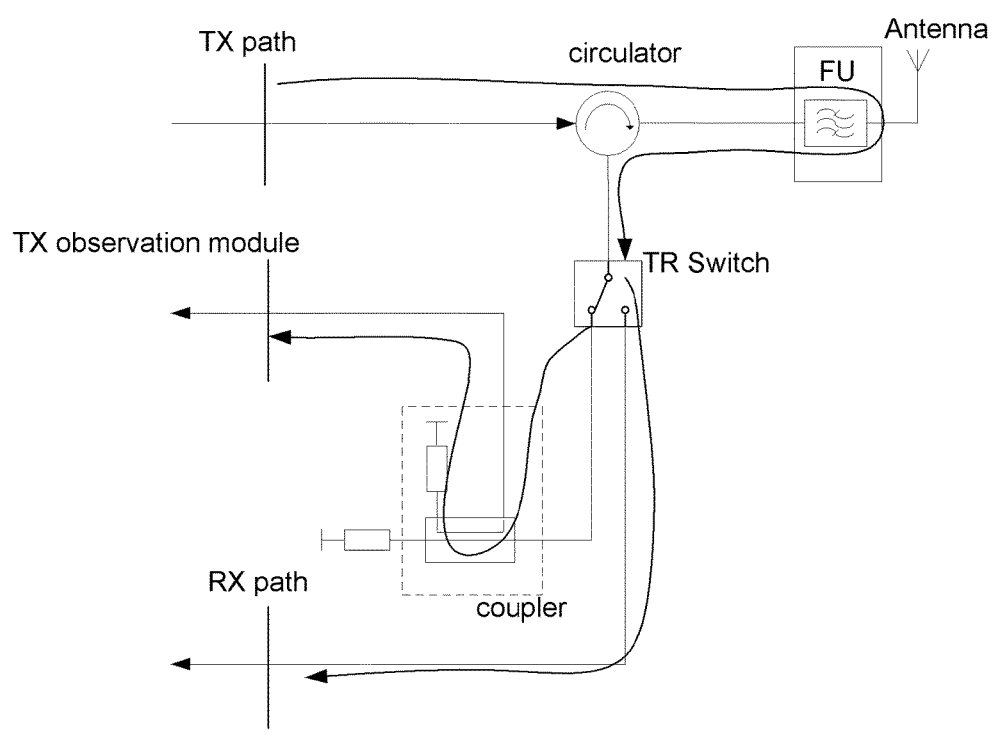
FIG. 6 shows the gain comparison between the TX observation module and the RX path in the embodiment shown in FIG. 5.

FIG. 6 shows the gain comparison between the TX observation module and the RX path. The line from the TX path to the TR switch represents a flow of a TX signal, the line from the TR switch to the TX observation module represents a flow of a TX reflection signal, and the line from the TR switch to the RX path represents a flow of a TX leakage signal. As said above, during the normal TX operation, the TX signal may be reflected from the filter unit or/and between the filter unit and the antenna. By connecting the TX observation module to the termination port of the TR switch, the TX reflection signal flows from the TR switch and passes through the TX observation module. The TX reflection signal will leak from the TR switch to the RX path, and passes through the RX path. The TX reflection signal leaking to the RX path is referred to as an TX leakage signal herein. In the path from TX path to TX observation module, the main contribution of the gain is the coupling factor of the coupler. In the path from the TX path to the RX path, the main contribution of the gain is the isolation of the TR switch. Therefore, the gain of the TX observation module and the gain of the RX path will remain constant if the TX oservation module and the RX path function well. The detector is further configured to detect a state of the TX observation module based on the gain of the TX observation module. Usually, the TX observation module is more robust than the RX path, and thus the state of the RX path may be supervised by caculating a gain difference of the gain of the TX observation module and the gain of the RX path, and comparing the calculated gain difference with a preset gain difference. The processor may determine that the RX path is abnormal if the TX observation module is normal while the calculated gain difference deviates from the preset gain difference by a value larger than a threshold.

Figure 7:
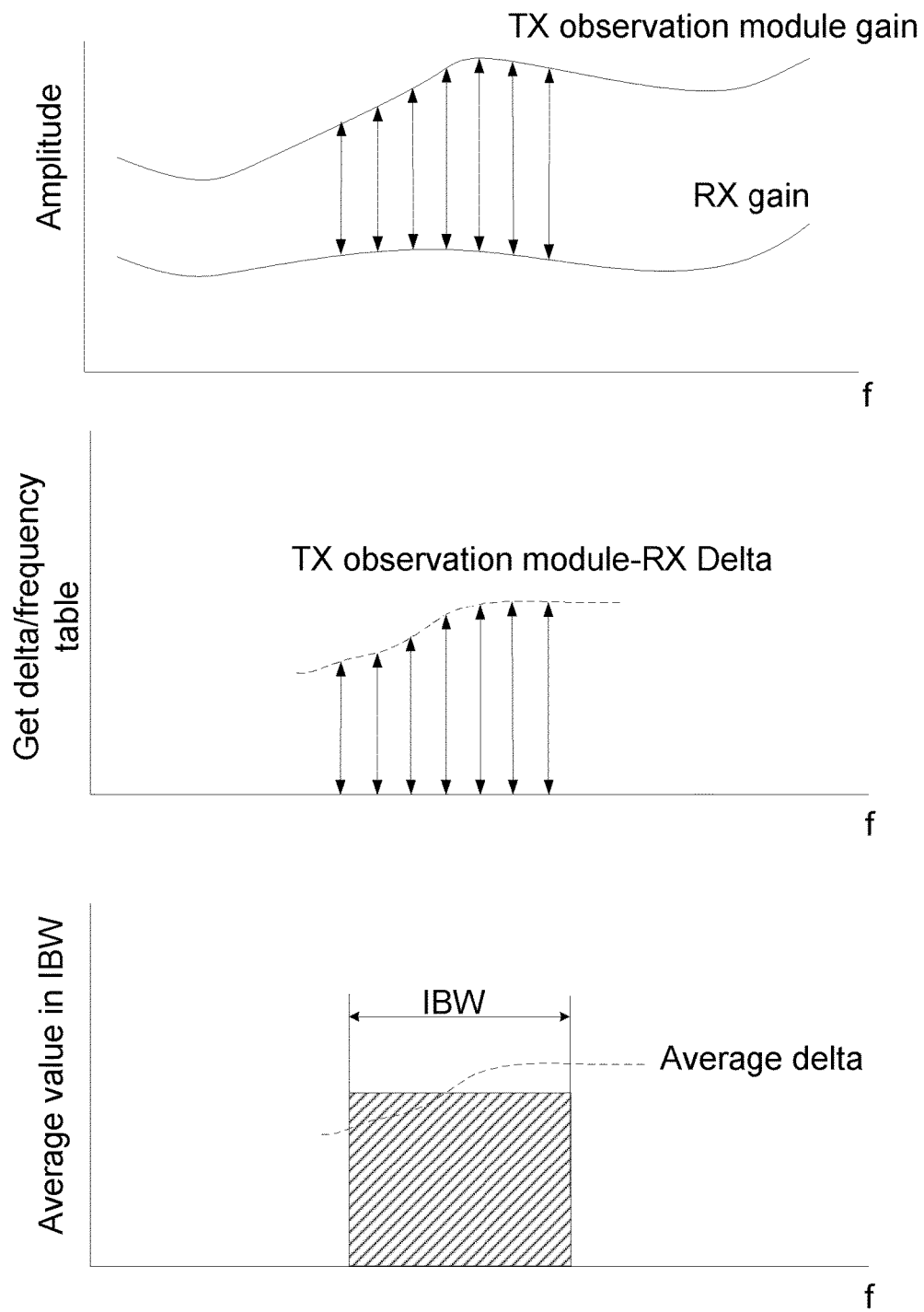
FIG. 7 shows an example calibration result according to the disclosure.

The preset gain difference may be obtained through a gain calibration process. In an embodiment, the preset gain difference may be obtained by injecting a test signal at the antenna port of the radio unit, setting the radio unit into the RX supervision status, detecting the gain of the TX observation module and the gain of the RX path, and calculating the gain difference. The test signal may be about +10 dBm. In order to obtain the gain difference over frequency within the RF band of the radio unit, the test signal shall cover the frequency and the detection is performed through frequency sweep. FIG. 7 shows an example calibration result. The gain differene is defined as the difference from the RX path to the TX observation module, and denoted as TX observation module -RX Delta in the figure.

Figure 8:
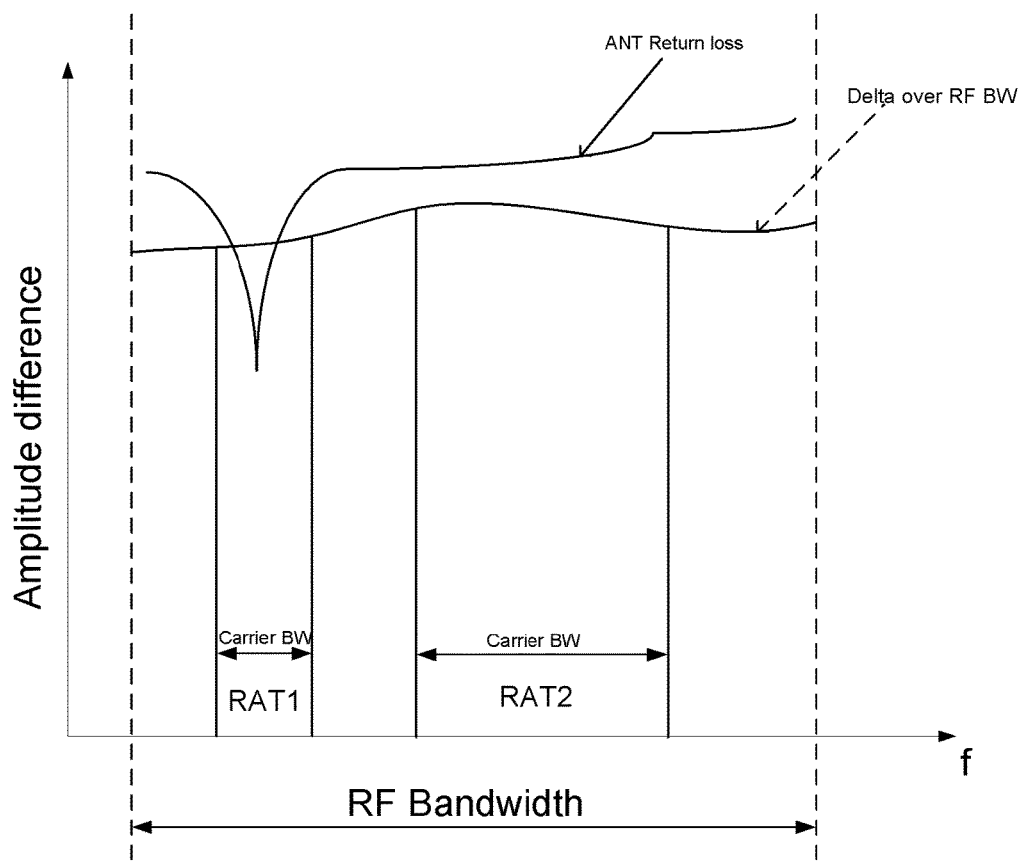
FIG. 8 shows an example of an RX supervision process of a TDD radio unit according to the disclosure.

During RX supervision of the radio unit, the radio unit will measure the gain of the TX reflection signal passing through the TX observation module and the gain of the TX leakage signal passing through the RX path, and compare the gain difference with the preset gain difference over the operating bandwidth of the radio unit. This result will indicate the state of the TX observation module and the RX path. FIG. 8 shows an example of an RX supervision process of a TDD radio unit.

Figure 9:
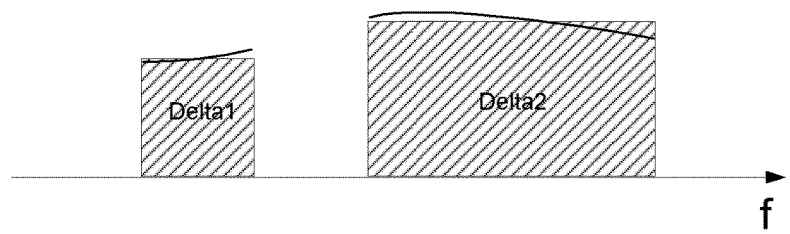
FIG. 9 shows an example of a preset gain difference of a radio unit that is capable of operating in more than one mode.

The power of the TX reflection signal has a dependency to return loss, and thus in some frequency point the reflection power could be very low/uncertain at the sharp frequency point as shown in FIG. 8. In an embodiment, an averaged value of the gain difference over the bandwidth of the radio unit will overcome this drawback to minimize the measurement error. In the embodiment, the processor is configured to calculate an average of gain differences of the TX leakage over the bandwidth of the radio unit, and calculate an average of preset gain differences of difference freqiencies over the bandwidth. FIG. 9 shows an example of a preset gain difference of a radio unit that is capable of operating in more than one mode. The radio unit may operate at one of two Radio access technique (RAT), and its RX supervision result is shown in FIG. 8. The averages of the gain differences over respective bandwidths for the two RATs are obtained as shown in FIG. 9, where Delta 1 corresponds to the average for RAT1, and Delta 2 corresponds to the average for RAT2. During the RX supervision of the radio unit, the gain difference of the TX observation module and the RX path is also averaged over the bandwidth of the used RAT, and compared with the average of the RAT shown in FIG. 9. For a multicarrier application, the RX supervision according to the disclosure could still work fine and the result could be considered as just adding delta1 and delta2 together as an example.

Figure 10:
FIG. 10 shows an example temperature drift of the TR switch.

The TR switch isolation may have a variation over temperature, and hence the temperature drift for the TR switch isolation may be taken as a design parameter which should be taken into account in the supervision result to improve accuracy of the RX supervision. FIG. 10 shows an example temperature drift of the TR switch.

Figure 11:
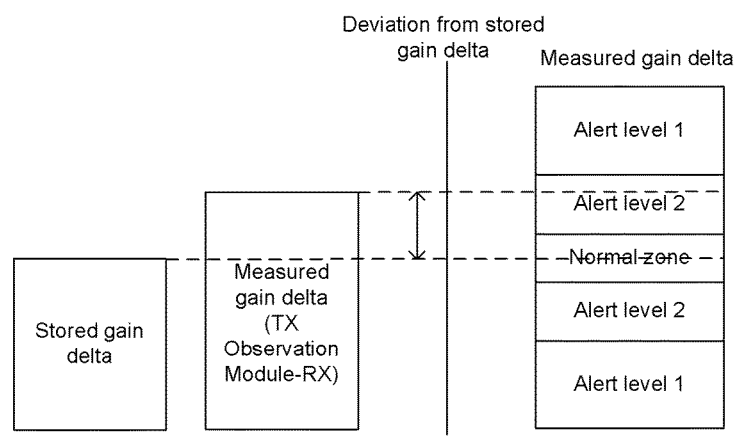
FIG. 11 illustrates an example of RX supervision of a TDD radio unit according to the disclosure.

FIG. 11 illustrates an example of RX supervision of a TDD radio unit according to the disclosure. The gain difference of the TX observation module and the RX path is obtained and compared with the preset gain difference. The deviation can be divided from a nominal value to Level 1 up to further Level 2 with a certain threshold. Difference alerts may be generated according to the deviation. For example, if the deviation is below Level 1, a beep may be generated. When the deviation is over Level 1, a more sharp beep is generated.

Figure 12:
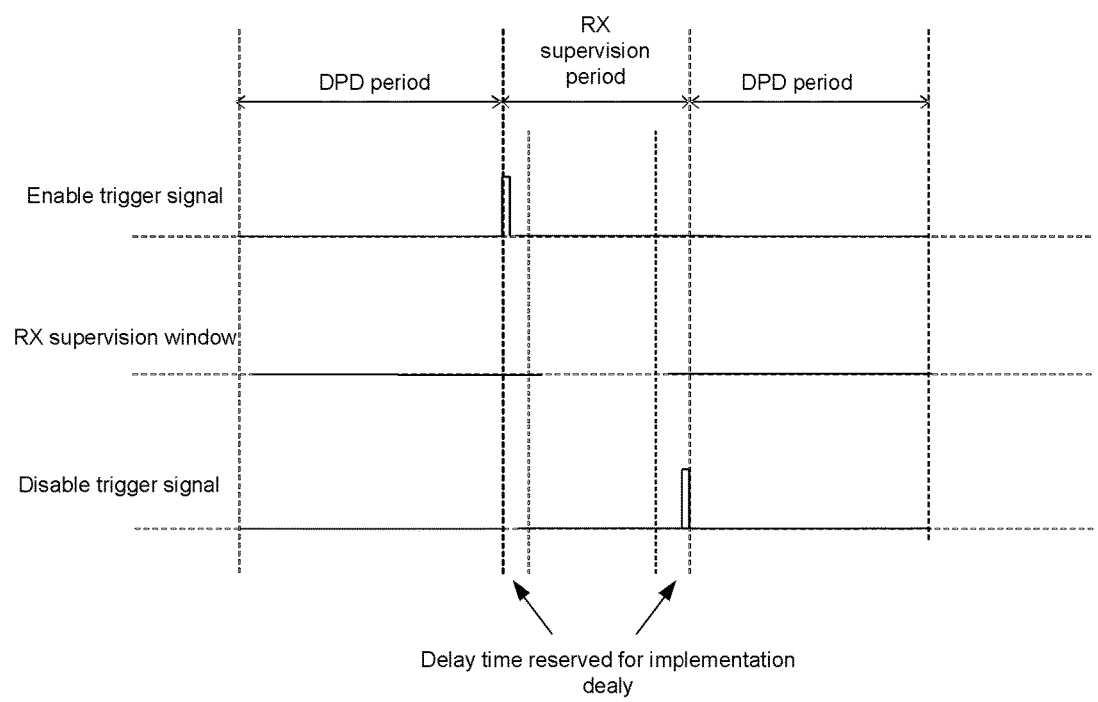
FIG. 12 shows an RX supervision time sequence.

Because TX observation module doesn't always work in the TX timeslot of the TDD radio unit, for example during the Digital Pre-Distortion (DPD) idle time, and thus the DPD idle time can be used as the RX supervision period in an embodiment. In the embodiment, the controller is configured to set the radio unit into the RX supervision status in a DPD idle period. FIG. 12 shows an RX supervision time sequence. When the radio unit enters the DPD idle period, it will trigger the RX supervision time window to start. After the RX supervision is completed, a trigger signal will trigger the radio unit to go back to a normal DPD period. The RX supervision time window may be set safely according to the embodiment, and compatible with the current TX observation module function for the DPD operation.

Figure 13:
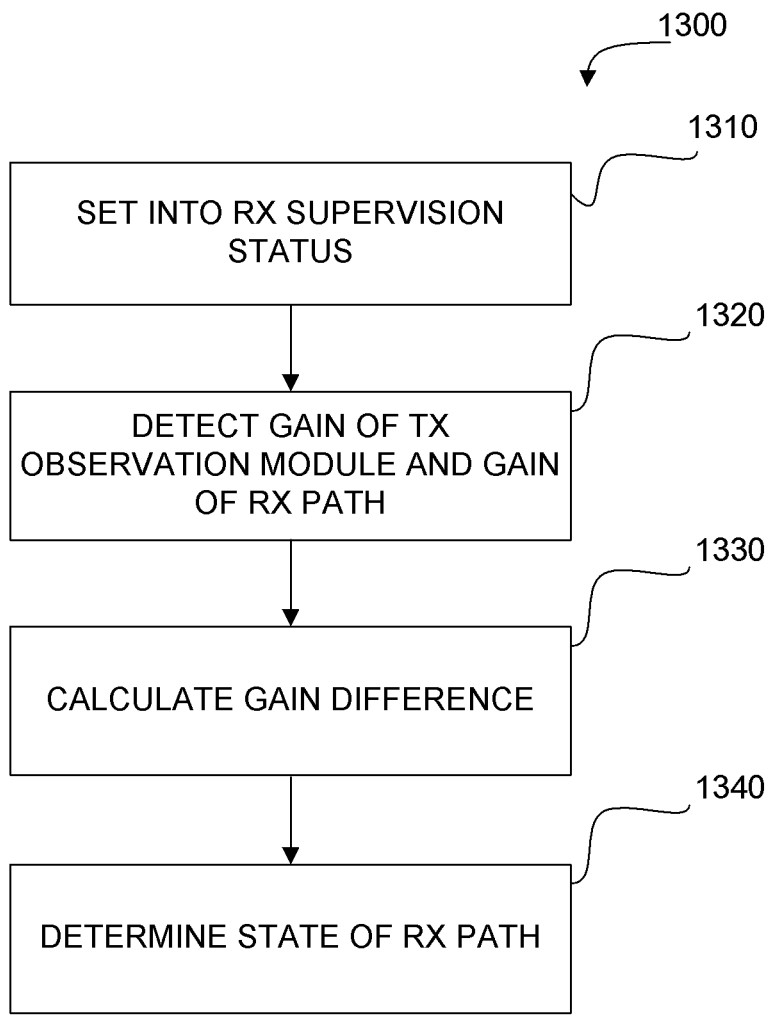
FIG. 13 illustrates a flowchart of an RX supervision method for use in a TDD radio unit according to an embodiment of the disclosure.

FIG. 13 illustrates a flowchart of an RX supervision method for use in a TDD radio unit according to an embodiment of the disclosure. The method may be applied to the TDD radio unit shown in FIG. 5. As shown, at step 1310, the radio unit is set into an RX supervision status in a TX timeslot, by: connecting a TX observation module in the radio unit to a termination port of a TR switch in the radio unit; and setting all components in the RX path in a power-on status. The method then proceeds to step 1320, where a gain of the TX observation module by means of a signal from the TR switch passing through the TX observation module and a gain of the RX path by means of a TX leakage signal passing through the RX path are detected. At step 1330, a gain difference between the TX observation module and the RX path is calculated. The method then proceeds to step 1340, where the calculated gain difference is compared with a preset gain difference to determine a state of the RX path.

In an embodiment, the RX supervision status is triggered in a DPD idle period. As shown in FIG. 12, the RX supervision time window placed in a DPD idle period is safe and compatible with the current TX observation module function for the DPD operation. In the embodiment, the method further comprises a step of exiting the RX supervision status and entering a normal DPD period when, for example, the RX supervision method ends.

In an embodiment, the method further comprises a step of detecting a state of the TX observation module based on the gain of the TX observation module. Usually, the TX observation module is more robust than the RX path. If the TX observation module is normal while the calculated gain difference deviates from the preset gain difference by a value larger than a threshold, the method further comprises a step of determining that the RX path is abnormal.

As said anove, the TR switch isolation may have a variation over temperature, and hence the temperature drift for the TR switch isolation may be taken as a design parameter which should be taken into account in the supervision result to improve accuracy of the RX supervision.

The power of the TX reflection signal has a dependency to return loss, and thus in some frequency point the reflection power could be very low/uncertain at the sharp frequency point as shown in FIG. 8. In an embodiment, an averaged value of the gain difference over the bandwidth of the radio unit will overcome this drawback to minimize the measurement error. In the embodiment, an average of gain differences of the TX leakage over the bandwidth of the radio unit is calculated and taken as the gain difference that is detected and an average of preset gain differences of difference freqiencies over the bandwidth is calculated and taken as the preset gain difference.

Figure 14:
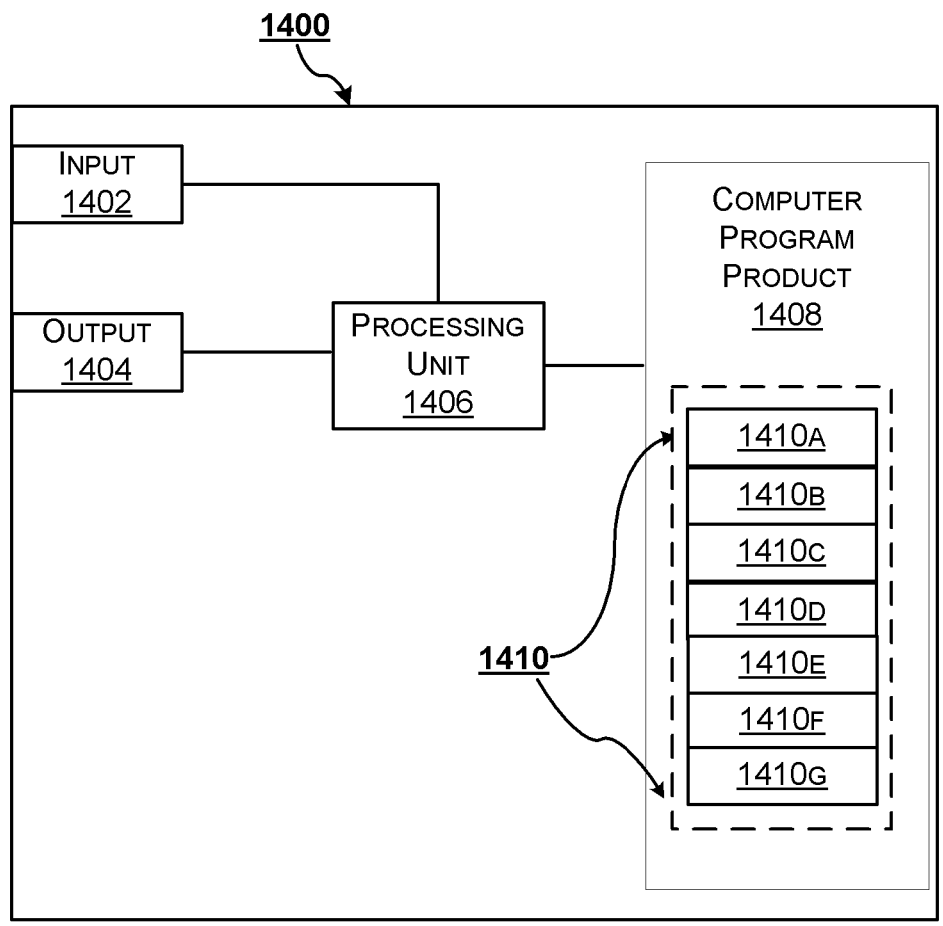
FIG. 14 schematically shows an embodiment of an arrangement 1400 which may be used in the TDD radio unit according to the disclosure.

FIG. 14 schematically shows an embodiment of an arrangement 1400 which may be used in the TDD radio unit according to the disclosure. Comprised in the arrangement 1400 is here a processing unit 1406. The processing unit 1406 may be a single unit or a plurality of units to perform different actions /functions described herein. The arrangement 1400 may also comprise an input unit 1402 for receiving signals from other entities, and an output unit 1404 for providing signal(s) to other entities. The input unit and the output unit may be arranged as an integrated entity.

Furthermore, the arrangement 1400 comprises at least one computer program product 1408 in the form of a non-volatile or volatile memory, e.g., an Electrically Erasable Programmable Read-Only Memory (EEPROM), a flash memory and a hard drive. The computer program product 1408 comprises a computer program 1410, which comprises code/computer readable instructions, which when executed by the processing unit 1406 in the arrangement 1400 causes the arrangement 1400 and/or the TDD radio unit in which it is comprised to perform the actions, e.g., of the procedure described earlier in conjunction with FIG. 13.

The computer program 1410 may be configured as a computer program code structured in computer program modules 1410A-1410G. Hence, in an exemplifying embodiment when the arrangement 1400 is used in the TDD radio unit according to the disclosure, the code in the computer program of the arrangement 1400 includes a setting module 1410A for setting the radio unit into an RX supervision status in a TX timeslot. The code in the computer program 1410 further includes a detecting module 1410B, for detecting a gain of the TX observation module by means of a signal from the TR switch passing through the TX observation module and a gain of the RX path by means of a TX leakage signal passing through the RX path. The code in the computer program 1410 may further include a calculating module 1410C, for calculating a gain difference between the TX observation module and the RX path. The code in the computer program 1410 may further include a comparing module 1410D, for comparing the calculated gain difference with a preset gain difference to determine a state of the RX path. The code in the computer program 1410 may comprise further modules, illustrated as module 1410E, e.g. for exiting the RX supervision status and entering a normal DPD period. The code in the computer program of the arrangement 1400 may further include a detecting module 1410F for detecting a state of the TX observation module. The code in the computer program 1410 may further include a determining module 1410G for determining that the RX path is abnormal if the TX observation module is normal while the calculated gain difference deviates from the preset gain difference by a value larger than a threshold.

The computer program modules could essentially perform the actions of the flow illustrated in FIG. 13, to emulate the TDD radio unit according to the disclosure.

Although the code means in the embodiments disclosed above in conjunction with FIG. 14 are implemented as computer program modules which when executed in the processing unit causes the processing unit to perform the actions described above in conjunction with the figures mentioned above, at least one of the code means may in alternative embodiments be implemented at least partly as hardware circuits.

The processing unit 1406 may be a single CPU (Central processing unit), but could also comprise two or more processing units. For example, the processing unit may include general purpose microprocessors; instruction set processors and/or related chips sets and/or special purpose microprocessors such as Application Specific Integrated Circuit(ASICs), Field Programable Gate Array(FPGAs) or Digital Signal Processing(DSPs). The processing unit may also comprise board memory for caching purposes. The computer program may be carried by a computer program product connected to the processing unit. The computer program product may comprise a computer readable medium on which the computer program is stored. For example, the computer program product may be a flash memory, a Random-access memory(RAM),a Read-Only Memory(ROM), or an EEPROM, and the computer program modules described above could in alternative embodiments be distributed on different computer program products in the form of memories within the TDD radio unit.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the disclosure should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

What is claimed is:

1. A Receive (RX) supervision method for use in a Time Division Duplex (TDD) radio unit, comprising:
    setting the TDD radio unit into an RX supervision status in a Transmit (IX) timeslot, wherein the setting comprises:
    connecting a TX observation module in the TDD radio unit to a termination port of a Transmit/Receive (TR) switch in the TDD radio unit; and
    setting all components in an RX path in a power-on status;
        detecting a gain of the TX observation module by means of a signal from the TR switch passing through the TX observation module and a gain of the RX path by means of a TX leakage signal passing through the RX path;
    calculating a gain difference between the TX observation module and the RX path; and
    comparing the calculated gain difference with a preset gain difference to determine a state of the RX path.

2. The method according to claim 1, where the RX supervision status is triggered in a Digital Pre-Distortion (DPD) idle period.

3. The method according to claim 2, further comprising:
    exiting the RX supervision status and entering a normal DPD period.

4. The method according to claim 1, further comprising:
    detecting a state of the TX observation module.

5. The method according to claim 4, further comprising:
   determining that the RX path is abnormal if the TX observation module is normal while the calculated gain difference deviates from the preset gain difference by a value larger than a threshold.

6. The method according to claim 1, wherein a temperature drift of the TR switch is taken into account when calculating the gain difference.

7. The method according to claim 1, wherein the calculated gain difference is an average of gain differences of the TX leakage signal over the bandwidth of the TDD radio unit, and an average of pre-set gain differences of difference frequencies over the bandwidth is used as the pre-set gain difference.

8. The method according to claim 7, wherein the bandwidth of the TDD radio unit is a bandwidth of an active mode of the TDD radio unit if the TDD radio unit is capable of operating in more than one mode.

9. The method according to claim 1, wherein the TX observation module comprises a Transmitter Observation Receiver (TOR).

10. A Time Division Duplex (TDD) radio unit comprising a transmit (TX) path for transmission and a Receive (RX) path for reception, and a Transmit/Receive (TR) switch, the TDD radio unit further comprising:
   a transmitter observation receiver connecting to the TX path and used for monitoring the TX path;
   a controller configured to set the TDD radio unit into an RX supervision status in a TX timeslot, by: connecting the transmitter observation receiver in the TDD radio unit to a termination port of the TR switch, and setting all components in the RX path in a power-on status;
   one or more processors configured to:
      detect a gain of the transmitter observation receiver by means of a signal from the TR switch passing through the transmitter observation receiver and a gain of the RX path by means of a TX leakage signal passing through the RX path, and
      calculate a gain difference between the transmitter observation receiver and the RX path, and compare the calculated gain difference with a preset gain difference to determine a state of the RX path.

11. The TDD radio unit according to claim 10, wherein the controller is configured to set the TDD radio unit into the RX supervision status in a Digital Pre-Distortion (DPD) idle period.

12. The TDD radio unit according to claim 11, wherein the controller is further configured to:
   cause the TDD radio unit to exit the RX supervision status and enter a normal DPD period.

13. The TDD radio unit according to claim 10, wherein the one or more processors are further configured to detect a state of the transmitter observation receiver.

14. The TDD radio unit according to claim 13, wherein the one or more processors are configured to determine that the RX path is abnormal if the transmitter observation receiver is normal while the calculated gain difference deviates from the preset gain difference by a value larger than a threshold.

15. The TDD radio unit according to claim 10, wherein the one or more processors are configured to take a temperature drift of the TR switch into account when calculating the gain difference.

16. The TDD radio unit according to claim 10, wherein the one or more processors are configured to calculate an average of gain differences of the TX leakage over the bandwidth of the TDD radio unit as the calculated gain difference, and calculate an average of preset gain differences of difference frequencies over the bandwidth as the preset gain difference to be used.

17. The TDD radio unit according to claim 10, further comprising:
   a coupler used for coupling power from the TX leakage signal of the TR switch; and
   a switcher for switching the transmitter observation receiver between the TX path and the coupler.

18. The TDD radio unit according to claim 17, further comprising:
   an adjustable attenuator configured to adjust the gain of the TX leakage signal over the transmitter observation receiver.

19. The TDD radio unit according to claim 10, wherein the TDD radio unit is a network node or a terminal device.

* * * * *